(12) United States Patent
Yu

(10) Patent No.: US 6,851,173 B2
(45) Date of Patent: Feb. 8, 2005

(54) METHOD FOR JOINING METAL COMPONENT BY PRESS-FIT CONNECTION

(75) Inventor: Che-Min Yu, Hsin-Chuang (TW)

(73) Assignee: Datech Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/294,670

(22) Filed: Nov. 15, 2002

(65) Prior Publication Data
US 2004/0040141 A1 Mar. 4, 2004

(30) Foreign Application Priority Data
Aug. 27, 2002 (TW) .................................. 91213375 U

(51) Int. Cl.⁷ ............................................... B23P 11/00
(52) U.S. Cl. .............................. 29/525; 29/509; 29/521; 29/505
(58) Field of Search .......................... 29/505, 521, 525, 29/509, 515

(56) References Cited

U.S. PATENT DOCUMENTS

| 2,321,755 | A | * | 6/1943 | Kost ........................... 52/592.3 |
| 3,909,919 | A | * | 10/1975 | Miyabayashi et al. ......... 29/521 |
| 4,443,979 | A | * | 4/1984 | Varon et al. .................. 52/36.6 |
| 5,237,734 | A | * | 8/1993 | Polon ........................... 29/513 |
| 5,520,475 | A | * | 5/1996 | Coolman et al. ........... 403/242 |
| 6,217,346 | B1 | | 4/2001 | Cubon ........................... 439/78 |
| 6,343,773 | B1 | * | 2/2002 | Baer et al. .................. 248/200 |
| 6,502,295 | B1 | * | 1/2003 | Morgand ...................... 29/509 |

* cited by examiner

Primary Examiner—David P. Bryant
Assistant Examiner—Stephen Kenny
(74) Attorney, Agent, or Firm—Troxell Law Office PLLC

(57) ABSTRACT

A method for joining a metal component with a connection, wherein the metal component has a hole, the metal component is placed in an inner channel of a metal plate, and using a head type punch metal of the metal plate is forced into the corresponding hole of the metal component thereby joining the metal plate and the metal component with the press-fit connection.

2 Claims, 4 Drawing Sheets

METHOD FOR JOINING METAL COMPONENT BY PRESS-FIT CONNECTION

FIELD OF THE INVENTION

The present invention is related to a method for joining a metal component by punching connection, more particularly, related to forcing a metal plate into a corresponding hole of the metal component.

BACKGROUND OF THE INVENTION

Commonly know methods for joining a metal component to a metal plate are generally used to make products for computer technology, which join metal components. Thus, the connection of the components must be simple and not expensive. As a result, the most direct and easy solution is performed using a head type punch to forcing metal of the metal plate into the corresponding hole of the metal component for joining the metal plate and the metal component with a press-fit connection.

The conventional structure for joining the metal plate and the metal component includes rivet joints. As shown in FIG. 1, the rivet joint 1 is constructed by the metal plate and the metal component. It is complex and the hole not only reduces a strength of the material, but also wastes material. Soldered connections require additional complex and costly manufacturing steps and may result in unreliable connections. Waste from the soldering process is hazardous to the environment and expensive to dispose of safely.

The present invention addresses the disadvantages of the conventional structure by researching solutions for them which, following continuous research and improvements, culminated in the method and convenient structure for joining metal components by a press-fit connection of the invention. The methods of the present invention eliminates the numerous drawbacks of the conventional technology.

OBJECT OF THIS INVENTION

The main object of the present invention is to reduce production costs and improve metal connecting for mass produced components.

Another object of the present invention is to provide a location mark and a fixture for the press-fit connection performed by a head type punch.

SUMMARY OF THE INVENTION

Specifically, the present invention provides a method for joining a metal component with a press-fit connection, wherein the metal component has at least one hole, the metal component is placed in an inner channel of a metal plate, and using a head type punch to force metal of the metal plate into the corresponding hole of the metal component thereby joining the metal plate and the component with the press-fit connection.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The present invention overcomes the disadvantages of the conventional fastening structure. The embodiments of this invention will be described in detail with reference to attached drawings.

Figure 1:
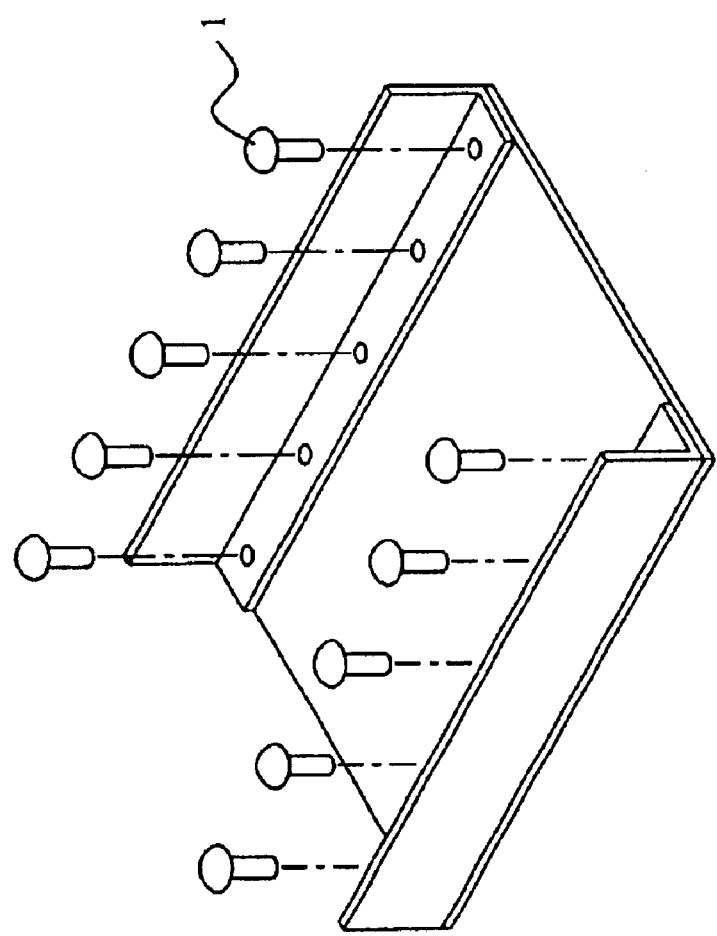
FIG. 1 is a perspective diagram of joining metal plate and metal component with rivet joint in accordance with the conventional structure.
Figure 2A:
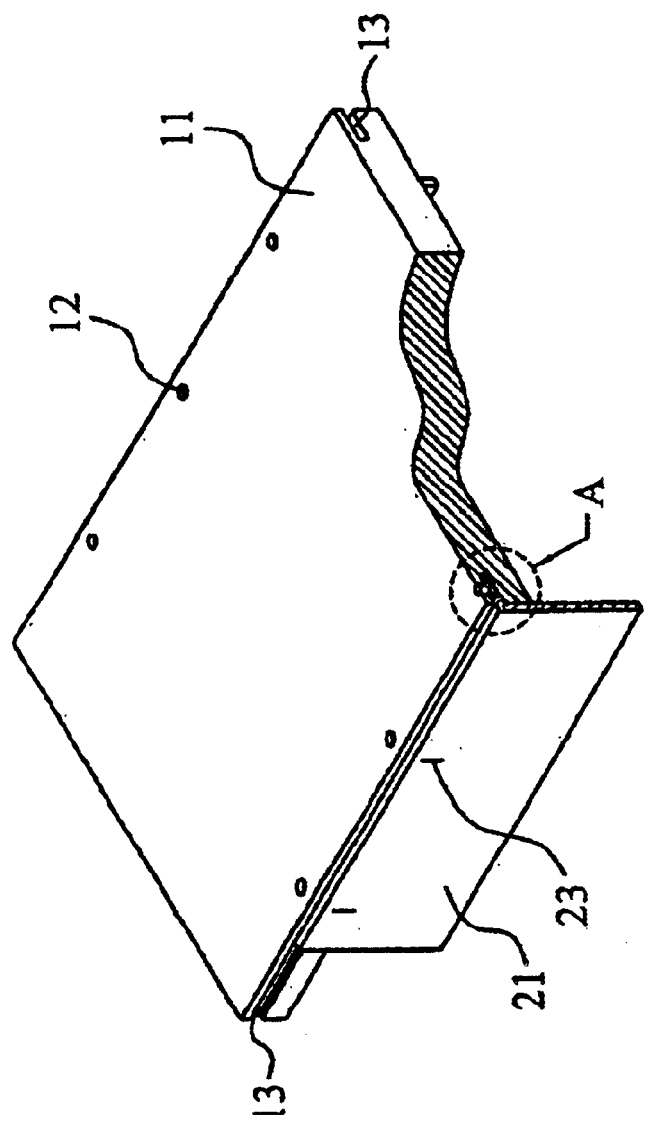
FIG. 2A is a perspective diagram of joining metal plate and metal component with press-fit connection in accordance with the present invention.
Figure 2B:
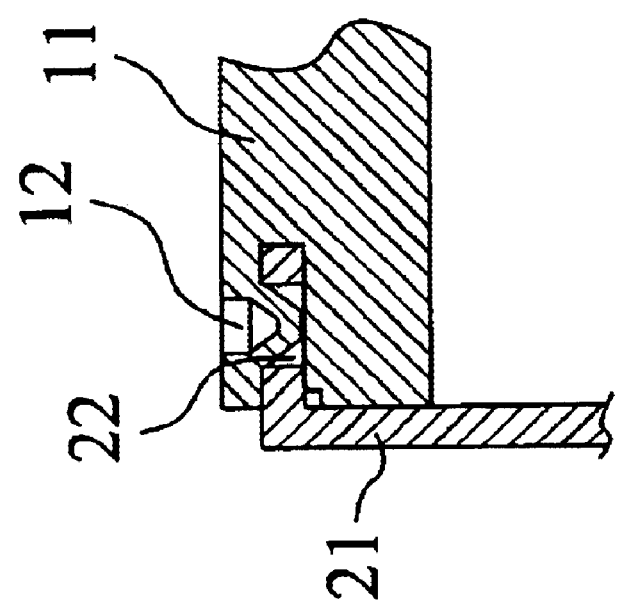
FIG. 2B is an enlargement of detail A in FIG. 2A.

FIGS. 2A and 2B illustrate the joining metal plate and the metal component connected with the press-fit connection in accordance with the present invention. The metal component 21 has at least one hole 22, the metal component 21 is placed in an inner channel 13 of a metal plate 11, and a head type punch 41 is used to force metal of the metal plate 11 into the corresponding hole 22 of the metal component 21 thereby joining the metal plate 11 and the metal component 21 with the press-fit connection.

Figure 3:
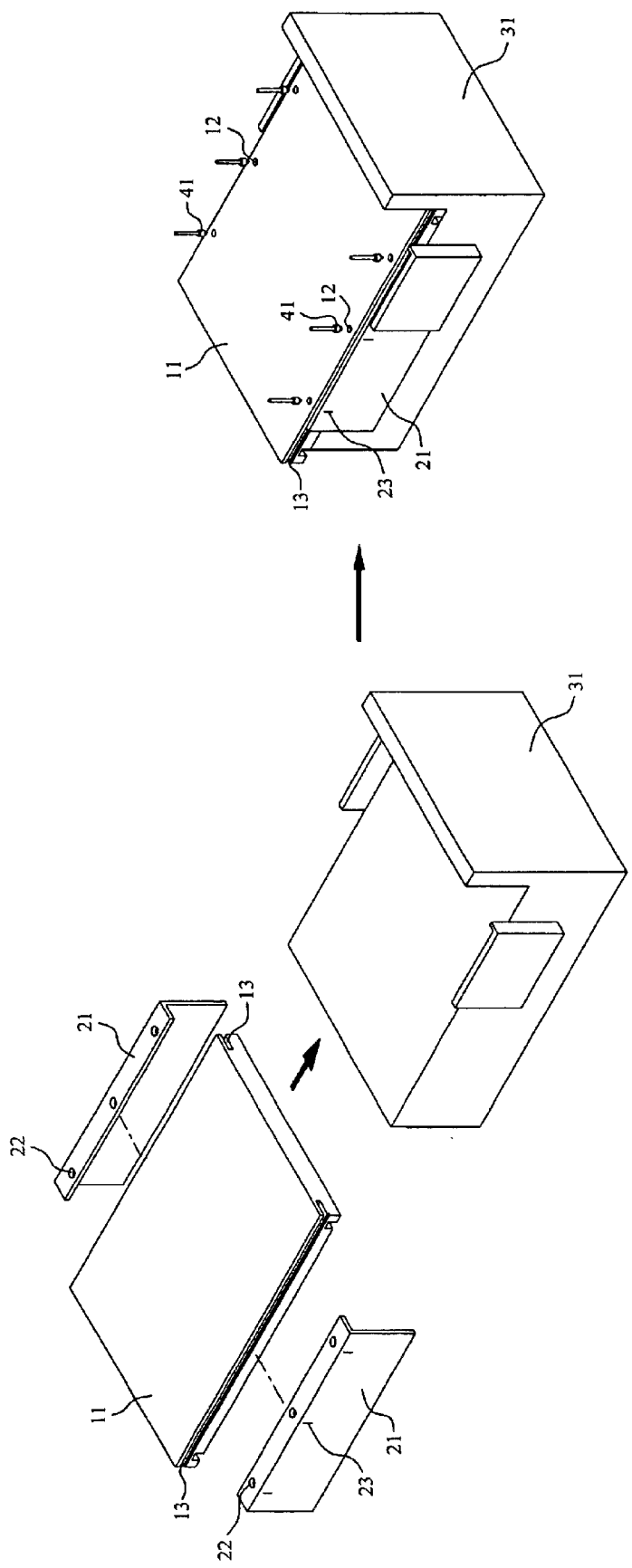
FIG. 3 is a perspective view of procedure of press-fit connection in accordance with the embodiment of the present invention.

In FIG. 3, procedure of press-fit connection is shown in accordance with the embodiment of the present invention. First, a location mark 23 of a location of the hole 22 on the metal component 21. Next, the metal component 21 and the metal plate 11 are positioned using a fixture 31 to automatically locate the metal component 21 in the inner channel 13 of metal plate 11. Finally, based on the location mark 23, the head type punch 41 is used to forcing metal of the metal plate 11 into the corresponding hole 22 of the metal component 21, thereby generating a punch concave mark 12 and joining the metal plate 11 and the metal component 21.

Alternatively, in present invention the metal plate 11 can be a copper plate. In FIG. 3, this invention also includes a location mark 23 and a fixture 31.

The present invention may be embodied in other forms without departing from the spirit of the essential attributes thereof. Therefore, the illustrated embodiment should be considered in all respects as illustrative and not restrictive, reference being made to the appended claims rather than to the foregoing description to indicate the scope of the invention.

What is claimed is:

1. A method for joining metal components using a press-fit connection comprising the steps of:
   a) inserting a metal component with at least one hole into an inner channel of a metal plate;
   b) aligning the metal component and the metal plate using a fixture;
   c) using a location mark on the metal component spaced apart from each of the at least one hole to mark the location of the at least one hole, the location mark being visible when the at least one hole is inserted into the inner channel.
   d) deforming the metal plate with a head type punch to force metal from the metal plate into the at least one hole of the metal component to connect the metal component and the metal plate; and
   e) forming at least one circular concave punch mark in the metal plate adjacent to the at least one hole of the metal component.

2. The method for joining metal components with a press-fit connection according to claim 1, wherein the metal plate is made of copper.

* * * * *